Dec. 5, 1967 T. E. WIRTANEN 3,355,979

ATTACHMENT FOR A SIGHTING DEVICE FOR SIGHTING IN OPPOSITE DIRECTIONS PERPENDICULAR TO THE OPTICAL AXIS OF THE DEVICE

Filed Dec. 31, 1963 4 Sheets-Sheet 1

INVENTOR.
THEODORE E. WIRTANEN
BY Wade Koontz and
Arsen Tashjian
ATTORNEYS

FIG.3-A

INVENTOR.
THEODORE E. WIRTANEN
BY Wade Koontz
Arsen Tashjian
ATTORNEYS

Dec. 5, 1967 T. E. WIRTANEN 3,355,979

ATTACHMENT FOR A SIGHTING DEVICE FOR SIGHTING IN OPPOSITE DIRECTIONS PERPENDICULAR TO THE OPTICAL AXIS OF THE DEVICE

Filed Dec. 31, 1963 4 Sheets-Sheet 3

INVENTOR.
THEODORE E. WIRTANEN

BY Wade Koontz and Arsen Tashjian

ATTORNEYS

INVENTOR.
THEODORE E. WIRTANEN
BY Wade Koontz
Arsen Tashjian
ATTORNEYS 3,355,979
Patented Dec. 5, 1967

3,355,979

ATTACHMENT FOR A SIGHTING DEVICE FOR SIGHTING IN OPPOSITE DIRECTIONS PERPENDICULAR TO THE OPTICAL AXIS OF THE DEVICE

Theodore E. Wirtanen, Chelmsford, Mass., assignor to the United States of America as represented by the Secretary of the Air Force Filed Dec. 31, 1963, Ser. No. 334,945
2 Claims. (Cl. 88—2.6)

ABSTRACT OF THE DISCLOSURE

Linear collimating apparatus having a lens holding tube with a focussing lens inserted in each outer end thereof attached to the objective end of a telescope in perpendicular relationship therewith. A pair of mirror surfaces are interposed at 45 degree angles to the optical axis of the telescope serving to reflect one-half of each of the images entering the focussing lenses thereby producing a split-image presentation of two fixed points in the fields of view of the focussing lenses to permit the observer to accurately determine the line of sight between the two fixed points.

The invention described herein may be manufactured and used by or for the Government of the United States for governmental purposes without payment to me of any royalty thereon.

This invention relates to linear collimating apparatus for use with a theodolite and is more particularly concerned with providing an inexpensive, easily operated collimating instrument or attachment to permit the use of the theodolite as a precise collimator.

Many types of surveying instrument are available for use in a number of various ways. Generally, a plumb bob is suspended from the center of the instrument allowing the instrument to be centered over a reference point when properly leveled. In windy weather when surveyors work out of doors, the swinging action of the plumb bob causes much difficulty in accurately locating the instrument over the reference point. In order to overcome this difficulty, the plummet system may be used instead of the plumb bob thereby allowing the operator, by the use of a periscope sighting device, to locate the surveying instrument with respect to a reference point below the instrument. By observing the location of the reference point through the eyepiece of the periscope of the sighting device with reference to cross hairs in the periscope, an indication of the location of the reference point is obtained.

The above-described arrangements may be used to locate the surveying instrument with reference to a fixed point but are not useful where it is necessary to produce the line-of-sight determination from a known to an unknown point. Presently, this type of collimation is carried out employing a right angle collimating telescope which is aligned over geodetic triangulation stations on a tribrach or with a plumb bob. This is relatively slow and does not afford protection against deviation caused by wind currents nor does it offer the assurances of an optical plummet system as is employed on many theodolites.

The collimator herein disclosed retains all of the advantages of the plummet system with the additional feature that, when arranged in a vertical manner, the collimator may be used to establish a reference between a geodetic station and a surveying instrument located directly over the station with respect to the local vertical. Also, the collimator is useful for collimating a horizontal line of sight or performing a linear collimating operation anywhere within a plane normal to the line of sight of the theodolite.

Accordingly, it is an object of the invention to provide an instrument for the simultaneous observation of two targets or marks and to determine thereby the angle of elevation of one target with respect to the other.

Another object of the invention is to provide an instrument for instantaneously collimating a line of sight normal to the plane of the sighting instrument. This is accomplished in a single operation as opposed to several separate surveying steps which were heretofore necessary to achieve the same objective.

A further object of the invention is to provide an instrument for use as a linear collimator of any two targets instantaneously, without regard to elevation differences or vertical alignment.

Another further object of the invention is to provide an instrument which permits the operator to set up directly above a mark and simultaneously receive the image of that area of the targets directly below and above the instrument, oriented to the local vertical.

Still another object of the invention is to provide an optical arrangement whereby the distances from the targets to the observer's viewing telescope are resolved through focusing lenses, which direct two aligned images into two image-splitting mirrors mounted perpendicular to each other and at an angle of 45 degrees to the observer's line of sight.

A still further object of the invention is to provide an instrument which may be used in the horizontal mode for the alignment of two targets 180 degrees apart, placing the two points at the same elevation with respect to the local vertical of the instrument.

These and other objects, features and advantages will become more apparent from the following description taken in conjunction with the illustrative embodiments in the accompanying drawings wherein.

Figure 4:
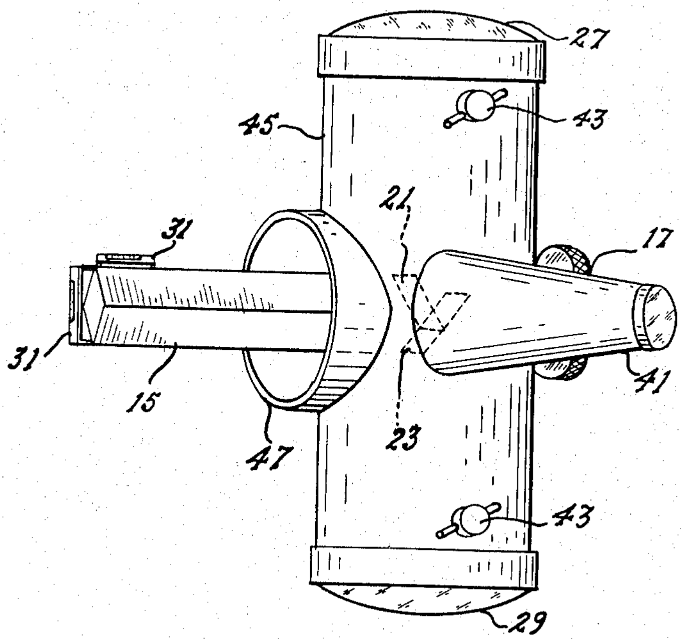
Figure 5:
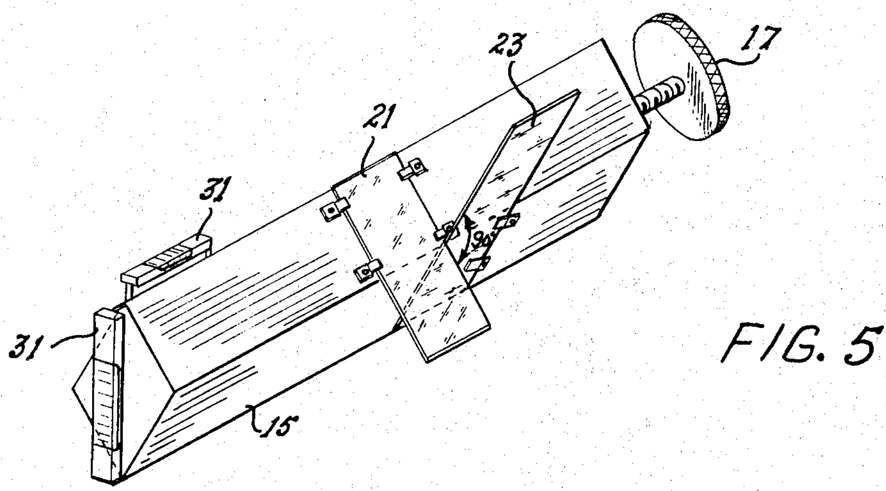
Figure 7:
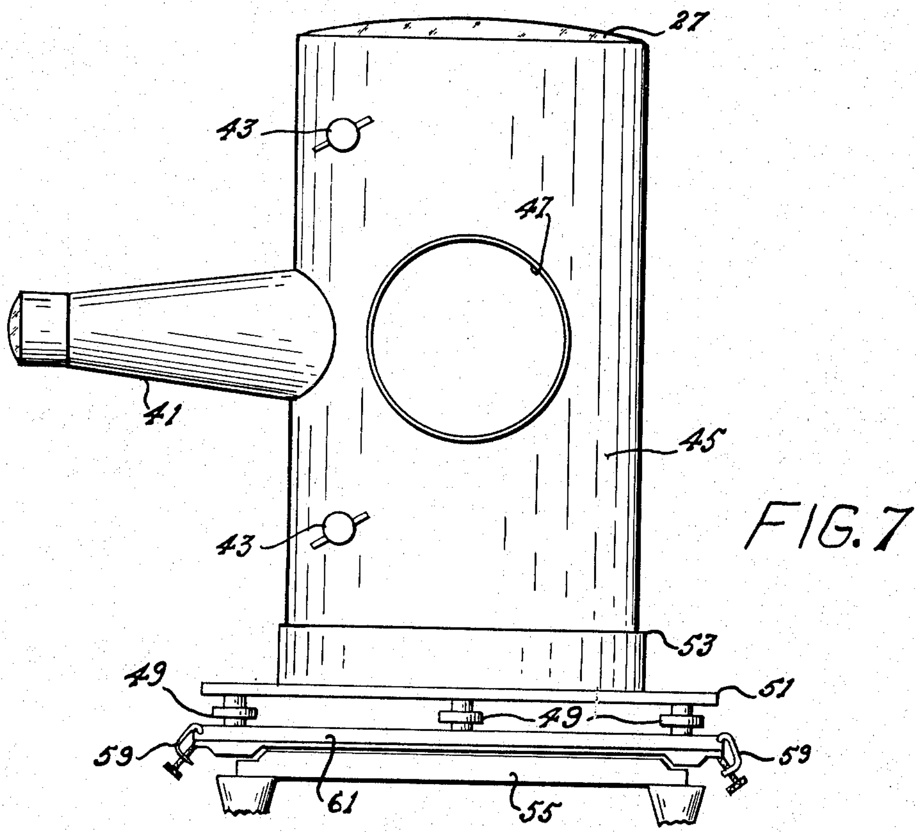
Figure 6:
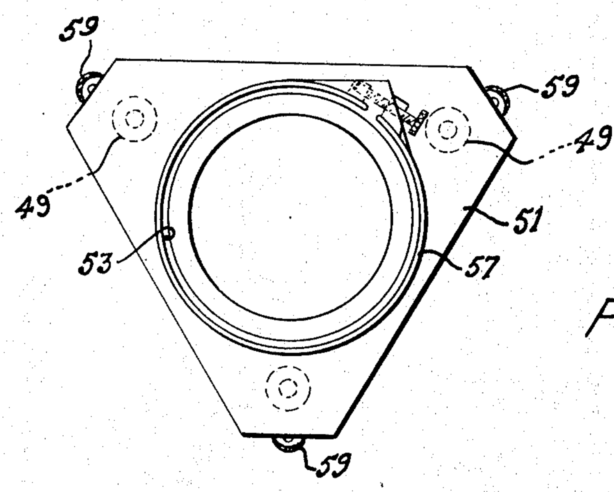

FIG. 3*a* is a view as seen by the operator while aligning a tower over a ground reference point;

FIG. 4 is a plan view of another embodiment of the invention in which the collimator and telescope are combined in a single instrument;

FIG. 5 is a view in perspective of another embodiment of the mirror mount in which the mirrors are mounted on the surface of the mounting stock;

FIG. 6 is a plan view of a tripod mount for mounting the collimator of FIG. 4 on a tripod; and FIG. 7 is a view of the assembled collimator mounted on a tripod for use in the vertical mode.

Figure 1:
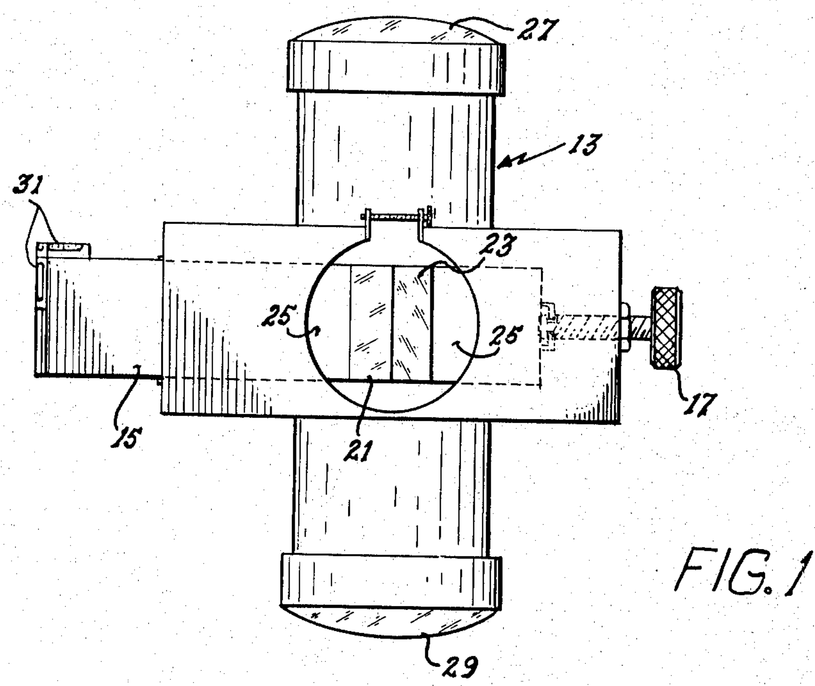
FIG. 1 is a plan view of the collimator for attachment to a theodolite or telescope.
Figure 2:
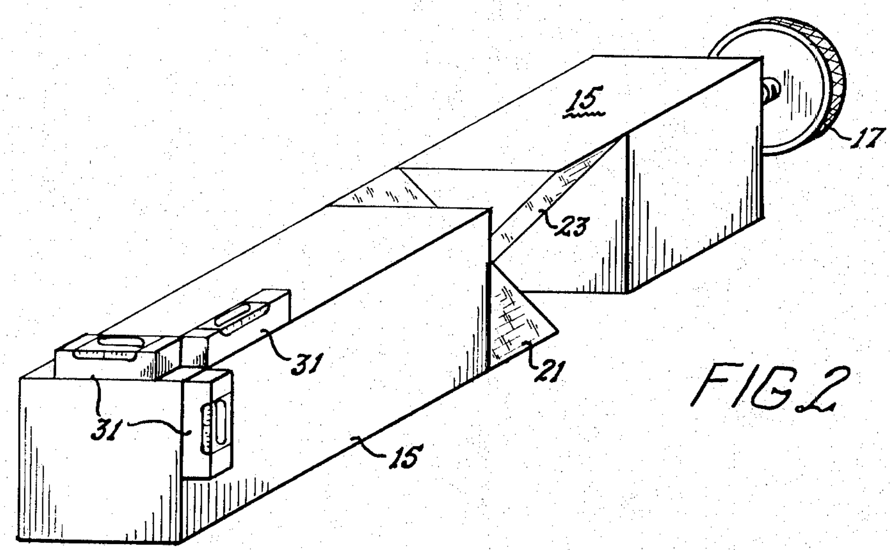
FIG. 2 is a view in perspective of the mirror mount showing one arrangement for providing reflective surfaces so that the images can be observed in the telescope.

Referring now to the drawings in which like reference characters are used to refer to like parts throughout the specification, the invention comprises a collimating instrument designated generally by the character 13 and being provided with a laterally adjustable mirror mounting bar 15. An adjusting screw 17 is threaded through wall of the housing member 19 and attached to one end of the mounting bar 15 so that rotation of the screw 17 causes the bar 15 to move laterally back and forth depending on the direction of rotation of the screw 17. Two first surface mirrors 21 and 23 are mounted laterally adjacent at 90 degrees to each other on the bar 15 and at a 45 degree angle to the opening 25 in the front of the housing 19. The mirror 21 is arranged to receive the image passing through the focussing lens 27 and direct it through the opening 25 and into the eyepiece of a conventional theodolite or telescope attached at the opening 25 and in optical alignment therewith. Likewise, the mirror 23 receives the image from focussing lens 29 and directs it through the opening 25 and into the telescope. A group of three spirit levels 31 are attached on one end of the mounting bar 15 to permit alignment in any two directions at one time by use of leveling screws on the mounting base (not shown in FIG. 1) thereby allowing the instrument 13 to be used as a collimator in both vertical and horizontal modes. For further accuracy, two semicircles may be etched on the mirrors 21 and 23 such that they meet in an apparent image as a circle.

Figure 3:
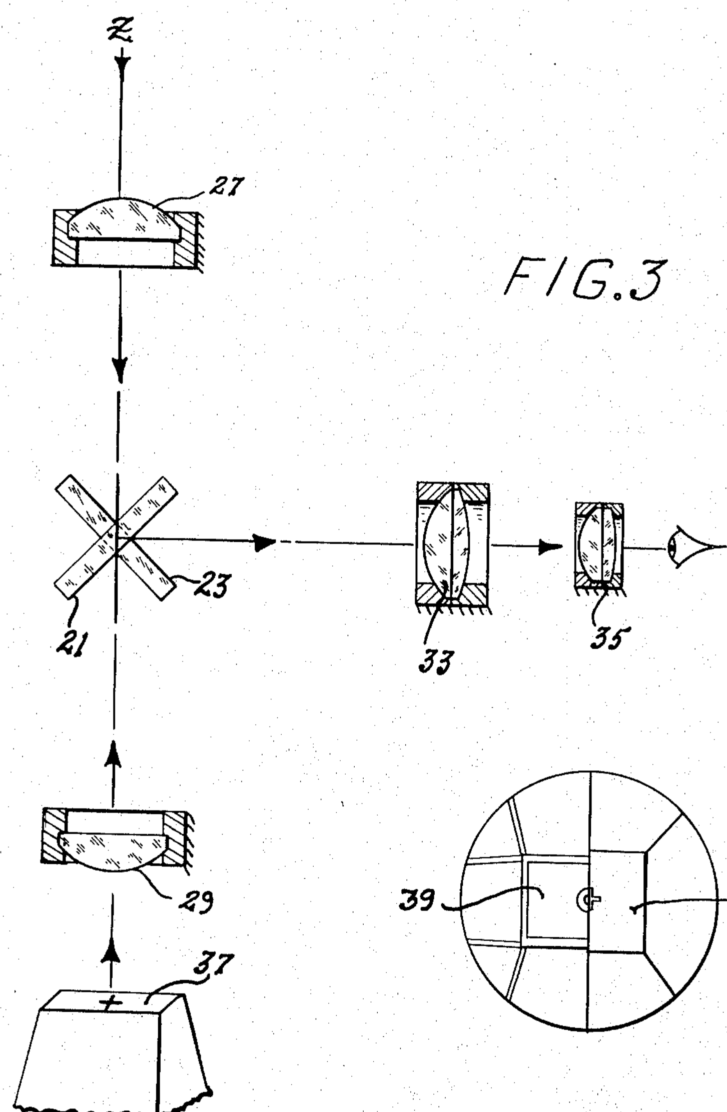
FIG. 3 is an optical schematic diagram of the lens and mirror arrangement.

In FIG. 3 there is shown the optical schematic diagram of the invention including a viewing telescope having the objective lens 33 and eyepiece 35. The line of sight is reflected by the mirrors 21 and 23 downward and upward respectively and passes through the focussing lenses 29 and 27 respectively. In a typical example where it is desired to align a tower target over a ground reference mark 37 the instrument is used in the vertical mode of operation. The operator's view in the telescope would appear as shown in FIG. 3*a* with the ground reference mark 37 appearing in one side of the field of view and the upper target appearing in the other side of the field of view being the apex of the tower 39. Thus, the exact location of the tower zenith can be accurately determined with reference to a point on the ground and oriented to the local vertical.

Another embodiment of the invention is shown in FIG. 4. In this embodiment a telescope 41 is an integral part of the instrument. Also, focussing lens adjusters 43 are attached to the lens holding tube 45 in order to focus the split image seen in the telescope 41. A cylindrical sleeve member 47 projects from one side of the tube 45 for use when the instrument is positioned for horizontal collimation. In FIG. 5 there is shown a detailed enlarged view of the mirror mounting bar 15 with the mirrors 21 and 23 attached thereto. Spirit levels 31 and an adjusting screw 17 are attached at either end of the bar 15.

FIG. 7 shows an instrument according to the invention in assembled form with the mirror mounting bar 15 removed. Leveling screws 49 are provided for adjusting and aligning the instrument. A mounting plate 51 shown in FIG. 6 with a mounting collar 53 attached thereto is positioned on the tripod mount 55. A tangent screw 57 serves to tighten the mounting collar 53 around the lens holding tube 45 when the instrument is in operating position. The clamps 59 hold lower mounting plate 61 in position on the upper surface of the tripod so that the leveling screws 49 are provided with a smooth working surface.

In operation, the linear collimating instrument is used by fastening the clamps 59 over the vertices of the lower mounting plate 61 of a standard tripod. The lens holding tube 45 is then inserted into the mounting collar 53 and the tangent screw 57 is tightened therearound thereby holding the tube 45 in position. The instrument is then leveled by manipulating the leveling screws 49 while observing the levels 31 on the mirror mounting bar 15. By means of the focussing lens adjusters 43, the upper and lower lenses 27 and 29 are positioned so that the reference mark and the target area are in sharp focus to the observer looking into the telescope 41. The mirrors 21 and 23 attached to the mounting bar 15 are brought into alignment by means of the adjusting screw 17 so that the inside edges of the mirrors are brought into apparent coincidence with the centerline of the reference mark. A mark placed on that portion of the target area most nearly in coincidence with this image of the reference mark will be in 180 degree alignment with the reference mark. By repeating the operation through 360 degrees in the vertical mode, the circle of probability can be established.

It should be noted that there is presently available theodolite attachments which include tiltable mirror arrangements which are useful for collimating a line of sight. However, any movable mirror arrangement is subject to wear of the moving parts which results in angular discrepancies and inaccuracies. Although in general surveying work, these inaccuracies may be insignificant, where extreme accuracy is required, an instrument utilizing the movable mirror would be unusable. For example, in accurately locating objects in space with reference to earth, it is often necessary to horizontally collimate two points on earth which are distances of upwards to 50 miles apart. Discrepancies of one inch in 50 miles on earth can mean errors of many thousands of miles when considered in relation to heavenly bodies in outer space. Thus, the invention herein described by utilizing fixed mirrors which split the telescopic image, overcomes the problem of inaccuracies due to mechanical wear of parts and provides a means for determining with unusually precise accuracy, the exact line of sight between reference points and objects on earth which are great distances apart.

From the foregoing it will be seen that the invention has been presented with particular emphasis on certain preferred embodiments. It will be apparent to one skilled in the art that various changes, alterations, modifications and substitutions can be made in the arrangement and location of the various elements without departing from the true spirit and scope of the invention as defined in the appended claims.

Having thus set forth and disclosed the nature of my invention, what I claim is:

1. A linear collimating attachment apparatus for a telescope sighting device for accurately determining the line of sight between two fixed points, said apparatus comprising, a lens holding tube for attachment to the objective end of said sighting device to extend perpendicular to the optical axis thereof linearly in opposite directions, focussing lenses mounted at each end of said lens holding tube, an adjustably mounted mirror mounting bar positioned partially within said lens holding tube and in perpendicular relationship therewith and with said sighting device, two laterally adjacent crossed mirror surfaces positioned at right angles to each other on said mounting bar, the optical axis of said sighting device forming 45 degree angles with the surfaces of said mirrors and arranged to reflect a part of the images received from said focussing lenses through the eyepiece of said sighting device, each of said mirrors reflecting one-half of the image within the field of view of each corresponding focussing lens, said images being in juxtapositioned relationship to each other producing a split-image presentation of the field of view of the focussing lenses, thereby allowing an observer to determine the alignment between targets in opposite directions perpendicular to the optical axis of said sighting device.

2. The apparatus defined in claim 1 including means for adjusting the position of said focussing lenses within said lens holding tube to bring the targets into sharp focus.

References Cited

UNITED STATES PATENTS

| | | | |
|---|---|---|---|
| 578,459 | 5/1897 | Leuner | 88—14 |
| 3,074,315 | 1/1963 | Seibel et al. | 350—68 |
| 3,216,309 | 11/1965 | Hartmeister | 88—2.4 |
| 3,229,562 | 1/1966 | Reisinger | 350—25 |

JEWELL H. PEDERSEN, *Primary Examiner.*

O. B. CHEW, *Assistant Examiner.*